Patented Apr. 18, 1933

1,904,406

UNITED STATES PATENT OFFICE

MICHAEL J. CALLAHAN, OF PARLIN, NEW JERSEY, ASSIGNOR TO E. I. DU PONT DE NEMOURS & COMPANY, OF WILMINGTON, DELAWARE, A CORPORATION OF DELAWARE

METHOD OF REDUCING THE SOLUTION VISCOSITY OF CELLULOSE

No Drawing.   Application filed July 2, 1930. Serial No. 465,454.

This invention relates to a method of reducing the normal solution viscosity of cellulose. Cellulose derivatives of solution viscosities much lower than normal from cellulose of reduced solution viscosity, are suitable for use where cellulose derivatives having subnormal solution viscosity combined with normal film forming properties are desired. One of the disadvantages of cellulose derivatives for use in solutions and in coating compositions is the high solution viscosity of the product as made by the usual methods. This difficulty is common to all derivatives of cellulose, and has interfered with the general commercial application of such derivatives, especially in coating compositions such as lacquers, varnishes and the like, in which the cellulose derivative is dissolved in a volatile solvent. A highly viscous product when dissolved and thinned to a consistency useable for such purposes carries such a small proportion of film forming ingredient and such a high content of expensive solvents, that the dried film is too thin for practical purposes, and too expensive to appeal to the lacquer trade.

It has been proposed to reduce the solution viscosity of cellulose by treating the cellulose with hydrogen chloride under conditions which results in the degradation of the cellulose nucleus with complete loss of the fibrous structure in the more or less powdery product. This loss in fibrous structure is especially disadvantageous in the nitration of the cellulose because of the mechanical difficulties in recovering the nitrating acid mixture consisting of a mixture of nitric and sulfuric acids. The nitrocellulose, made from cellulose treated with hydrogen chloride in the aforesaid manner, cannot be satisfactorily separated from the acid by centrifuging because the finely divided condition of the product permits it to escape with the nitrating liquid. Another method, known to the prior art, of producing low solution viscosity nitrocellulose is to nitrate high solution viscosity cellulose and subsequently reduce the solution viscosity of the nitrocellulose by heating in water suspension under pressure. This latter method is a relatively dangerous operation.

This invention has as an object an improved method of preparing solution low viscosity cellulose. A further object is the preparation of low solution viscosity cellulose derivative by a process which is easily controlled and economical.

The first object is accomplished by the following invention in which cellulose is treated with an acid gas, preferably hydrogen chloride, under conditions which reduce the solution viscosity of the cellulose without substantially impairing its fibrous structure. The second object is accomplished by treating the aforesaid cellulose of reduced solution viscosity with a reagent capable of forming the desired cellulose derivative.

I have found that the solution viscosity of cellulose can be effectively and uniformly reduced and controlled by treatments with very small proportions of hydrogen chloride. The following examples are illustrative of the preferred methods of carrying out the invention, although it will be understood that the invention is not limited thereto, as other modes of procedure may be adapted within the spirit of the invention.

Example 1

A sample of air-dried cotton linters, which had been freed from waxes and other impurities by a caustic digestion, was treated at room temperature for one-half hour with an amount of hydrogen chloride equal to 0.5% by weight of the cotton. The hydrogen chloride was very strongly adsorbed, since no odor of it could be detected in the cotton linters. The treated cotton linters were allowed to stand 48 hours at room temperature. The material was then washed to remove the hydrochloric acid, and dried. The viscosity of the resulting cellulose in cuprammonia solution was 1.207 compared with water as one. The solution viscosity of the original linters was so high that the cellulose would not dissolve in the cuprammonia solution.

The method of determining the solution viscosity was as follows: Dudley pipettes of 100 cc. capacity, giving draining times of 33–35 secs. for water at 25° were selected and standardized, using distilled water. During use the pipettes were surrounded by a water jacket at 25° C. On measuring the solution viscosity of a sample of cotton, 3.05 gms. of cupric hydroxide, 2.00 gms. of cotton linters, and 225 cc. of ammonium hydroxide (Sp. gv. 0.96) at 25° C. are introduced into an 8 oz. wide mouth bottle, the bottle is closed by means of a cork, and the mixture is shaken exactly two minutes. The solution is then allowed to stand exactly one minute, after which it is drawn into the pipette and the time of draining of 100 cc. is measured with a stop-watch. The specific solution viscosity is calculated by reference to the draining time of water.

The measured or calculated amount of hydrogen chloride gas may be passed from any suitable source into a closed vessel, as a bell jar, containing the cellulose to be treated. The amount of hydrogen chloride, expressed as a percentage of the weight of the cellulose, with which the cellulose is treated, may vary from about 0.1% to about 2%. The duration of the treatment, which includes the time during which the cellulose with its adsorbed hydrogen chloride stands before the treatment is discontinued by washing or otherwise separating the reagent from the cellulose, depends upon the percentage of hydrogen chloride used; the temperature at which the treatment takes place; and the reduction in viscosity desired. For instance, cellulose treated with 0.1% hydrogen chloride at room temperature, about 25° C., may be permitted to stand twenty-four hours or more to obtain a desired solution viscosity, whereas one-half hour would be sufficient time at 100° C., for the same percentage of hydrogen chloride. A long time at 100° C. has a detrimental action upon the cellulose. As the amount of hydrogen chloride approaches the upper limit, the time of standing is shorter and the temperature lower in order that there shall be no substantial impairment of the fibrous structure of the cellulose. Thus with 2% of hydrogen chloride at room temperature the cellulose should not be permitted to stand after the gas is passed into the cellulose. It will be seen, therefore, that for a given percentage of hydrogen chloride, the amount of solution viscosity reduction of the cellulose is regulated by the time of treatment which in turn depends upon the temperature at which the treatment takes place. The hydrogen chloride treatment, however, (whether extended or brief as determined by the percentage of hydrogen chloride, the solution viscosity desired and the temperature), is according to the present invention, terminated before any substantial disintegration of the cellulose, or change in the fibrous structure takes place. The appearance and physical characteristics of the cellulose after the treatment is essentially the same as before the treatment.

I have found that the presence of moisture in the cellulose is important. With cellulose dried at 100° C., dry hydrogen chloride is not adsorbed appreciably and the solution viscosity reduction is slight. The treatment herein disclosed is most effective with moisture contents ranging from 2% to that in air-dried cellulose. The average moisture in air-dried cotton linters is from 5% to 6%. On highly humid days, it may be as high as 8% or more.

An important use for the low solution viscosity cellulose as prepared above, is the manufacture of low solution viscosity types of nitrocellulose as indicated by the following examples:

*Example 2*

Purified cotton linters, characterized by a solution viscosity of 1.80 compared to water as 1, are treated with 0.5% hydrogen chloride gas and allowed to stand five hours at 50° C. The solution viscosity of the cellulose is thereby decreased to 1.20–1.25. This cotton may be nitrated with a mixed acid containing approximately 22.5% nitric acid and 58.5% sulfuric acid for 30 minutes at 40° C. The resulting nitrocellulose contains about 11.8% nitrogen and has a solution viscosity between 2 and 3 seconds by the falling sphere method.

*Example 3*

The same type of high solution viscosity cotton linter is treated with 1% hydrogen chloride gas for three days at 25° C. The solution viscosity is then about 1.20 and on nitration yields a nitrocellulose of 2–3 seconds solution viscosity containing 11.8% nitrogen.

It is apparent from the examples that the exact conditions of concentration of hydrogen chloride, time, and temperature of treatment of the cotton linters may be varied quite widely and, provided the solution viscosity of the cotton comes out about the same, the nitrocelluloses which may be prepared from the pretreated cellulose have approximately the same viscosity characteristics if the nitrations are comparable.

Cellulose which is pretreated with hydrogen chloride gas so that its solution viscosity is thereby decreased may be used advantageously in the manufacture of reduced solution viscosity cellulose acetate by direct acetylation. Under the conditions of pretreatment as herein disclosed, it has been observed that the cellulose is rendered more reactive toward acetylating agents than an untreated cellulose.

In addition to the nitrocellulose and cellulose acetate, any cellulose derivative of the ester or ether type can be obtained in reduced solution viscosity form if prepared from a cellulose pretreated with hydrogen chloride gas in the manner described. Such low solution viscosity derivatives in many cases find application as substitutes for either nitrocellulose or cellulose acetate.

Hydrochloric acid gas is not the only acid which can be employed in my process. Other halogen acids such as hydrobromic acid or substances which produce the acids in the presence of water, may be used. Where it is desired to obtain better distribution of the gas throughout the cellulose, or to prolong the time necessary to accomplish the adsorption of the gas by the cellulose, the acid gas may be diluted by a non-reactive or inert gas, such as air or nitrogen.

My improved process for producing cellulose and cellulose derivatives is easily controlled and does not require expensive apparatus. It requires but a short amount of time to reduce the solution viscosity of the cellulose or the derivative thereof to a required degree, and thus makes possible a rapid turnover which is a distinct advantage in large scale manufacture. The fact that the fibrous structure of the cellulose is maintained and may therefore be easily separated from the liquid during centrifuging is of especial value in the production of cellulose nitrate because of the saving effected in recovering the nitrating mixture.

As many apparently widely different embodiments of this invention may be made without departing from the spirit and scope thereof, it is to be understood that I do not limit myself to the specific embodiments thereof except as defined in the appended claims.

I claim:

1. A method of reducing the solution viscosity of cellulose which comprises treating the cellulose with a gas containing a hydrogen halide as its sole reactive ingredient to reduce the solution viscosity of the cellulose, and discontinuing the treatment before the fibrous structure of the cellulose is substantially impaired.

2. A method of reducing the solution viscosity of cellulose which comprises treating the cellulose with a gas containing hydrogen chloride as its sole reactive ingredient to reduce the solution viscosity of the cellulose, and discontinuing the treatment before the fibrous structure of the cellulose is substantially impaired.

3. A method of reducing the solution viscosity of cellulose which comprises treating the cellulose with a gas containing, as its sole reactive ingredient, from .1% to 2% of its weight of hydrogen chloride, and discontinuing the treatment before the fibrous structure of the cellulose is substantially impaired.

4. The method of reducing the solution viscosity of cellulose which comprises treating the cellulose with a gas containing, as its sole reactive ingredient, from 0.1% to 2.0% of its weight of a hydrogen halide, and discontinuing the treatment before the fibrous structure of the cellulose is substantially impaired.

In testimony whereof, I affix my signature.

MICHAEL J. CALLAHAN.